United States Patent [19]
Cantone

[11] Patent Number: 5,734,781
[45] Date of Patent: Mar. 31, 1998

[54] VIDEOCASSETTE DEVICE WITH DIGITAL STORAGE AND VIDEOTAPE LOOP FOR ANALOG PLAYBACK

[75] Inventor: Michael R. Cantone, Westfield, N.J.

[73] Assignee: Lucent Technologies Inc., Murray Hill, N.J.

[21] Appl. No.: 537,565

[22] Filed: Oct. 2, 1995

[51] Int. Cl.⁶ .................... H04N 5/76; G11B 23/02
[52] U.S. Cl. ................................ 386/46; 360/132
[58] Field of Search ........................ 386/46, 68, 69, 386/95, 96, 104, 124; 360/131–132, 134, 136; 348/7, 10–13; 455/6.2, 6.3; H04N 5/76, 5/78

[56] References Cited

U.S. PATENT DOCUMENTS

| | | | |
|---|---|---|---|
| 4,723,181 | 2/1988 | Hickok | 360/72.2 |
| 5,055,947 | 10/1991 | Satoh | 360/62 |
| 5,130,792 | 7/1992 | Tindell et al. | 348/7 |
| 5,164,839 | 11/1992 | Lang | 358/335 |
| 5,377,051 | 12/1994 | Lane et al. | 386/81 |
| 5,508,871 | 4/1996 | Ng | 360/132 |
| 5,606,467 | 2/1997 | Hirata | 360/69 |
| 5,636,078 | 6/1997 | Tsai | 360/132 |

*Primary Examiner*—Andrew Faile
*Assistant Examiner*—Vincent F. Boccio

[57] ABSTRACT

A digital videocassette is provided having magnetic storage means for digitally storing compressed video and audio data and interface means for converting the stored data to analog. The converted data is played back through an audio-visual playback device, such as a videocassette recorder. Subscribing means are provided for obtaining information and for ordering movies and programs over a communications link or cellular network. The received programming can be downloaded onto the magnetic storage means for viewing at any time or played back instantly.

17 Claims, 3 Drawing Sheets

VIDEOCASSETTE DEVICE WITH DIGITAL STORAGE AND VIDEOTAPE LOOP FOR ANALOG PLAYBACK

FIELD OF THE INVENTION

The present invention is an apparatus for storing digitized audio-visual data, particularly a digital videocassette which contains magnetic storage means for storing digitized audio-visual data and having means for playing back the stored data either by interfacing with an audio-visual playback device, such as a videocassette recorder, or by having a built-in playback device. The present invention further contains subscribing means for obtaining information and for ordering movies and programs over a communications link or cellular network.

BACKGROUND OF THE INVENTION

Ever since the introduction of the VHS and Betamax video analog formats in the 1970s, the home video market has grown exponentially. Consumer home video electronics have reached almost every household in the United States and in many other countries. This widespread consumer acceptance led to the introduction of pre-recorded commercial motion pictures on video analog formats suitable for home viewing and the sale of blank videocassettes for home recording.

Typically, a VHS videocassette contains enough magnetic tape to record up to six hours of audio-visual data. The six-hour limitation is due to the limited amount of tape that the videocassette can house and the limited amount of analog information storable onto the surface of the tape. However, a magnetic memory disk used for storing digitized data, such as a hard disk in a personal computer, has a much greater storage capacity and can store many more hours of audio-visual play than an analog tape.

A major reason there is increased storage in a hard disk is due to advances in digital data compression technology. For example, a two-hour digitized movie suitable for display on a typical television frame containing approximately 525× 525 pixels with a 24 bits/pixel color resolution requires about 3 gigabytes of memory without data compression. With digital data compression, the amount of memory for the same movie may be about 1 gigabyte. It is foreseeable that the amount of memory will substantially decrease with continued advances in digital processing and compression technology.

Digital data compression minimizes bits representing information and is classified as lossless or lossy. With lossless compression, original data is recovered flawlessly, while lossy compression creates errors in the data. Thus, original data cannot be reconstructed perfectly. However, this does not mean that the original data is conveyed incorrectly.

Two popular techniques for performing data compression are known as vector quantization and discrete cosine transform with scalar quantization. Vector quantization replaces the exact value of a pixel with the nearest value from a limited set; therefore, it is lossy. Rounding numbers to the nearest value is a form of quantization itself—scalar quantization. Vector quantization extends one-dimensional scalar quantization by operating on multi-dimensional vectors.

Discrete cosine transform operates on the assumption that neighboring pixels are fairly similar. This technique eliminates inter-pixel redundancy and only represents components that contribute the greatest to the overall image; therefore, it is lossy.

Available formats for compressed video include the compact disk (CD), laser disk (LD), and iL, with the latter being the highest information density optical record and playback format available. These three formats store thousands and even millions of compressed data bits on a small amount of surface area. A light-emitting diode or a laser is used to scan the surface area and read the compressed data bits. Hence, these formats are usually referred to as optical formats.

The invention disclosed herein stores digitized and compressed audio-visual data and has means for playing back the stored data in analog format either by interfacing with a playback device, such as a videocassette recorder (VCR). Additionally, one embodiment of the present invention has subscribing means for communicating with a distribution center for accessing and receiving digital information representing video presentations or other information from a database at the distribution center.

SUMMARY OF THE INVENTION

The present invention is a digital videocassette having memory storage means for massive storage of compressed, digitized audio-visual data and interface means for playing back the stored data in analog format through a conventional videocassette recorder (VCR). In addition, the digital videocassette has subscribing means for downloading from a distribution center compressed digital data representing audiovisual information, such as movies and other audiovisual programs.

The increased functionality of the present invention is similar to the digital and optical formats played by compact disk or laser disk players including instantaneous transfer to any point in an audio or video segment and very high quality playback and stop motion effects. However, the present invention plays back the stored digitized data in analog format via a conventional VCR to forego the necessity of customized playback equipment.

Further features of the invention, its nature, and various advantages will be more apparent from the accompanying drawings and the following detailed description of the invention.

DESCRIPTION OF THE PREFERRED EMBODIMENTS

Figure 1:
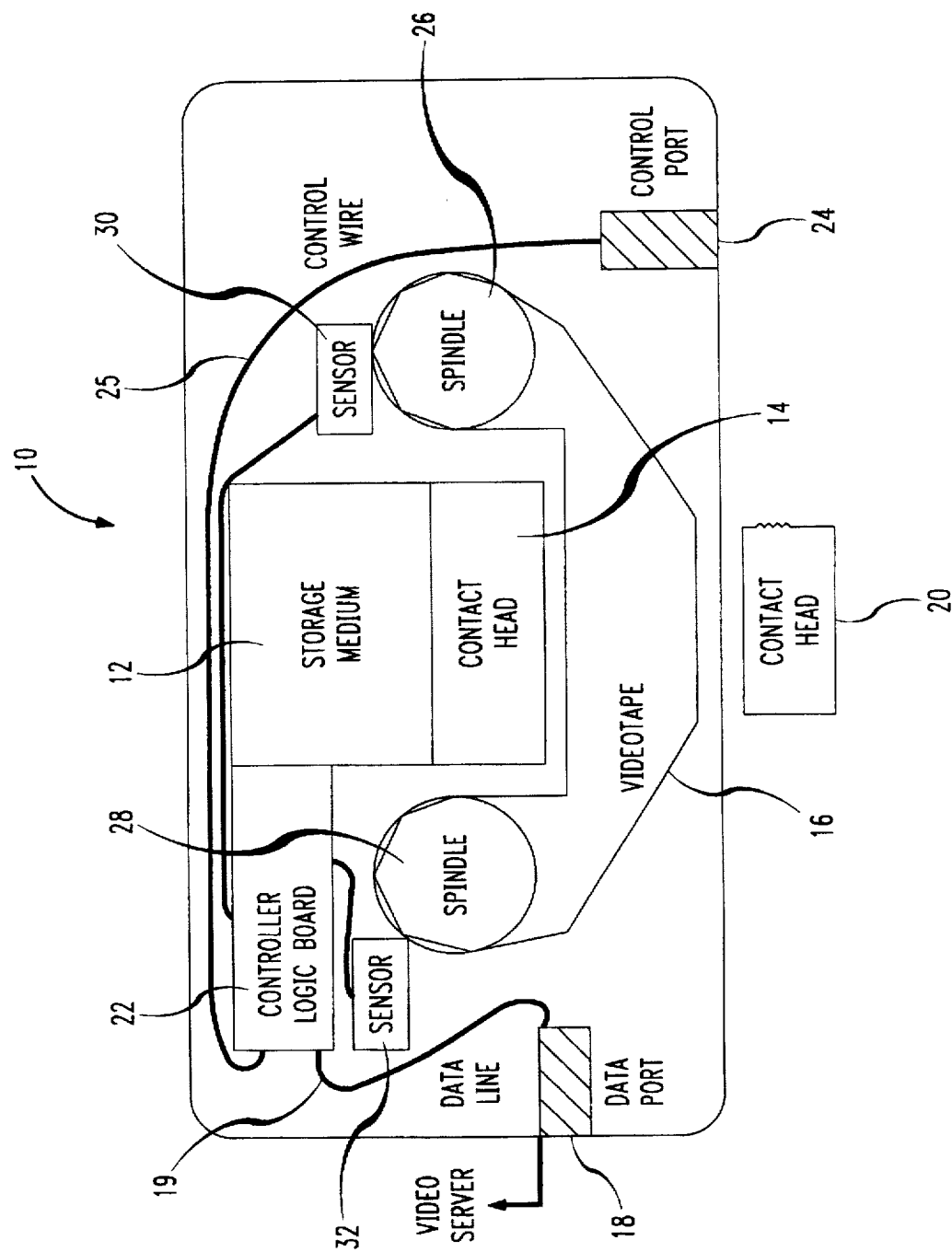
FIG. 1 is a schematic diagram of a top view of the digital videocassette of the present invention.

The digital videocassette of the present invention, as shown schematically by FIG. 1, includes optical or magnetic storage means, interface means, and subscribing means. The digital videocassette 10 stores digitized audio-visual data and is designed for interfacing with a conventional videocassette recorder (VCR) or any other playback device for playing back the stored information. In one embodiment, the present invention contains a built-in playback device, such as the playback head of a VCR, for direct playback through a television set.

The optical or magnetic storage means includes an optical or a magnetic storage medium 12 which is generally similar to a hard disk drive of a personal computer. The interface means includes a contact head 14 to transfer data converted from digital to analog onto a tape loop 16. The tape loop 16 is similar to conventional analog videotape. The tape loop 16 feeds the converted data to a contact head of a playback device 20. The playback method of the present invention is further described below. The subscribing means which is either a data download port 18 for connection to an external modem or a built-in modem is used to download audiovisual programs such as movies, television programs, or other information directly from a distribution center or a video server at a cable headend, shown by FIG. 2, onto the optical or magnetic storage medium 12 of the digital videocassette 10.

A video server is very similar to a computing server in that it is a storage/access device shared by many users. With a video server, however, users are enabled both to access stored video content and then have part of that delivered over a local or wide area network. The digitally encoded video at a video server is retained in a high capacity hierarchical system with the priority content stored on a fast random access media such as a magnetic disk.

Figure 2:
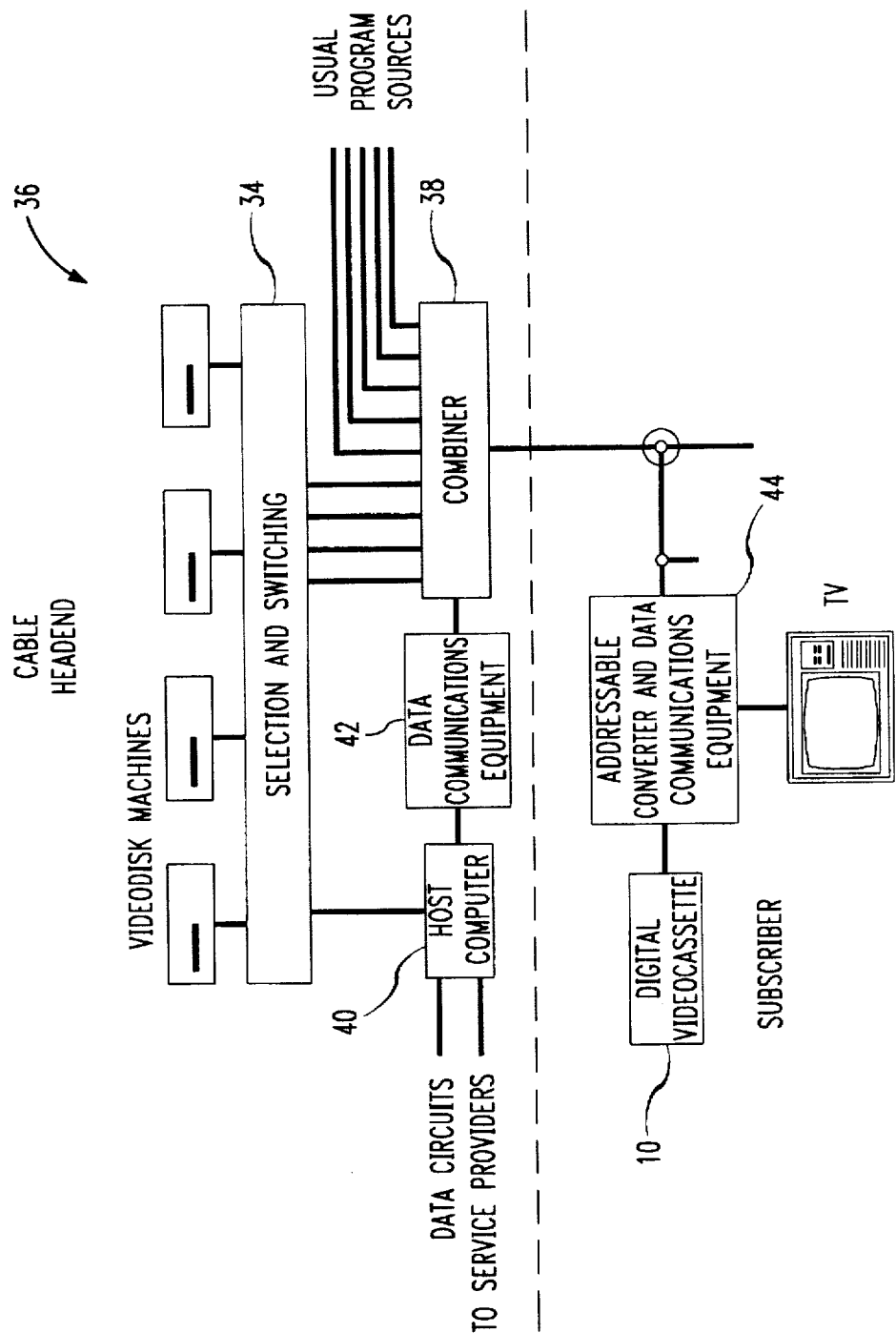
FIG. 2 is a block diagram of the invention connected via a communications network to a video server at a cable headend.

With reference to FIG. 2, selection and switching equipment 34 at the cable headend 36 of a wide or local area network directs the selected programming to a combiner 38 which delivers the programming to the subscriber. A computer 40 controls the combiner 38 via data communications equipment 42, as well as the selection and switching equipment 34.

The data download port 18 having a modem is used to communicate with the video server, via addressable converter and data communications equipment 44, for receiving a preferred program and viewing the program simultaneously. However, the user can opt to download the incoming program onto the magnetic storage medium 12 and view it at a later time. To save memory space, the incoming program can be digitally compressed by a magnetic medium controller logic board 22, which includes an analog to digital converter and programmable hardware, and stored onto the magnetic storage medium 12.

The data port 18 receives the incoming data from the video server and forwards the data to the controller logic board 22 via data line 19. If the data input is analog, the controller logic board 22 converts the data to digital. The controller logic board 22 includes the algorithm for performing data compression within the programmable hardware. The compressed digital data is then relayed and stored onto the magnetic storage medium 12. The subscriber may choose to view the stored program at any time. If the subscriber desires to view the incoming program as it is received from the video server, then the program is transferred from the controller logic board 22 directly to the contact head 14. However, the subscriber can both record and view the incoming program by providing commands to the digital videocassette 10 through a control port 24.

The advantageous features of the present invention include: user capabilities to have several movies or programs downloaded into a single videocassette due to the implementation of data compression; consumer subscription to a service that allows them to download the audio-visual data directly to their digital videocassette without leaving their homes (video-on-demand); capabilities to instantaneously access any point in a video program, as in compact-disk or video-disk players; and user on-demand VCR controls such as playback and stop motion.

The preferred data compression algorithm stored within the programmable hardware on the controller logic board 22 and utilized by the present invention is Moving Picture Experts Group (MPEG). MPEG video data compression technology makes it possible to deliver video entertainment at the CD standard data rates which range from 1.2 to 2.5 Mbits/sec. Further MPEG developments support data rates of up to 8 Mbits/sec. These high data rates are capable of supplying broadcast-quality video at resolutions of 576 lines by 720 pixels at 25 frames per second (fps) and 480 lines by 720 pixels at 30 fps. By using MPEG technology encoding and decoding at approximately 5.6 Mbits/sec, the present invention achieves broadcast-resolution video through an analog format for better picture quality.

Figure 3:
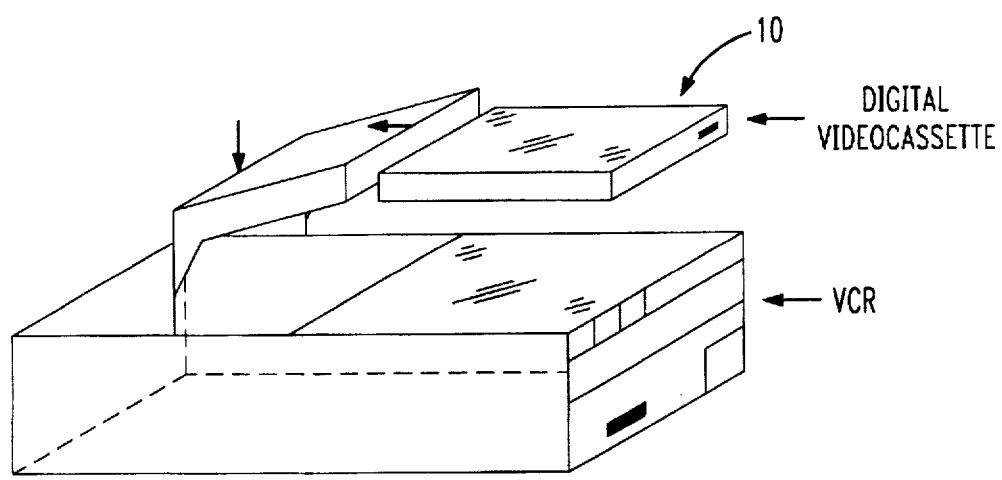
FIG. 3 is a perspective view of the digital videocassette being slidingly engaged with a top-loading videocassette recorder.

In a preferred embodiment, the apparatus according to the present invention is housed in a housing having dimensions of a standard VHS cassette. Thus, the apparatus interfaces with a VCR as would any VHS cassette, e.g., by being slidingly engaged with the VCR's videocassette slot (front-loading VCR) or holder (top-loading VCR), as shown by FIG. 3. When the PLAY button is pressed a few seconds of the digitized data is converted to analog by means of a digital to analog converter within controller logic board 22, and transferred to the tape loop 16. If the data is stored in a compressed format, then it is decompressed before it is converted to analog.

With reference to FIG. 1, the converted analog data is transferred and recorded onto the tape loop 16. During playback, the tape loop 16 continuously rotates and passes along the playback device's contact head 20 which reads the analog information. The recorded analog data is instantaneously erased from the tape loop 16 after it has been read by the playback head. The tape loop 16 then passes through the magnetic storage to tape contact head 14 where it is re-recorded with additional data.

The digital videocassette 10 has a thin control cable or a wireless form of remote, e.g., an infrared sensor, that functions with the control port 24 to allow the tape loop 16 to be rewound, fast-forwarded, stop-actioned, etc. or to command the magnetic storage medium 12 to record an incoming program. According to the remote commands received by the control port 24 and electrically transmitted to the magnetic medium controller logic board 22 via a control wire 25, the magnetic storage medium 12 is rewound, fast-forwarded, or stopped. The decompression and conversion of the stored data occurs instantaneously within the magnetic medium controller logic board 22 as the remote commands are received and translated to provide a real-time viewing response.

Viewer control during playback is achieved by having the controller logic board 22 sense the motion of two spindles 26 and 28. This is accomplished by having two sensors 30 and 32 relay information regarding the motion of the spindles 26 and 28 to the controller logic board 22. One sensor 30 is electrically coupled to the right spindle 26 and the other sensor 32 to the left spindle 28. If the right spindle 26 is rotating at greater than playback speed, then it is a cue to the logic board 22 that the user has triggered the fast forward function of the VCR; the digital videocassette 10 is fast-forwarded in response. Likewise, if the left spindle 28 is moving rapidly, it is a cue to the logic board 22 that the viewer would like to rewind the video and this function is digitally performed. If neither spindle is moving, then the "still frame/stop motion" effect is enacted.

Likewise, the controller logic board 22 may control viewing by directing the spindles 26 and 28 to rotate according to the functions received by the control port 24. The controller logic board 22 is pre-programmed to determine whether the Viewer has activated the play, fast-forward, rewind, or still frame operations by receiving electrical signals from the control port 24. It then directs the spindles 26 and 28 which are electrically coupled to the controller logic board 22 to rotate according to the commands received from the control port 24. It also directs magnetic storage medium 12 to play normally, still frame, or to spin forwards or backwards. If the fast-forward or rewind operations have been selected, the magnetic storage medium 12 spins forwards or backwards and the stored data is instantaneously transferred to the controller logic board 22 where it is decompressed and converted to analog. The data is then routed to the contact head 14 where it is transferred to the tape loop 16. As the tape loop 16 rotates the viewer sees the program being fast-forwarded or rewinded. The viewer can press the PLAY or STILL FRAME buttons when the desired location in the program is found.

It is noted that there is a time lapse between the data fed to the contact head 14 and the data fed to the playback device's contact head 20. In other words, the viewer does not see what is being recorded onto the tape loop 16. Therefore, in a preferred design, the tape loop 16 does not rotate a great distance in order to have a small amount of time lapse between the data recorded onto the tape loop 16 by the contact head 14 and the data played back by the playback device's contact head 20.

Another method of viewer control during playback is having an infrared sensor protruding beyond the transport mechanism door. In this embodiment, the infrared signals from the playback device, such as a VCR, are captured and interpreted to perform the analogous digital functions. Additionally, a dedicated infrared remote can be provided for the digital videocassette 10 which allows functions atypical of standard playback devices to be performed (e.g., play, slow motion backwards, instantaneous transfer to any point in the video, fast-forward, rewind, etc.).

The present invention includes fine adjustment controls that can be adjusted to affect and calibrate the granularity of the fast-forward, rewind, and still frame operations. These controls can be adjusted automatically through the thin control cable or control port 24.

In the context of video rentals, the present invention can be used to digitally compress and store movies, whereby the consumer does not have to carry home two or more analog videocassette tapes. Additionally, the video store can have a mass computer database of movies, instead of individual videocassette tapes for each movie. The video store can download the consumer's selections onto the digital videocassette 10 and charge a fee. However, if the consumer rents only one movie, then the video store can opt to rent the analog version of the movie or charge a fee if the consumer prefers to have the movie digitally compressed and stored onto the digital videocassette 10. The video store can also charge a fee if the consumer rents two or more movies and prefers to have them downloaded to the digital videocassette 10 owned by the consumer.

A concern of rental agencies is to prevent consumers from watching the same movie forever. That is, without precautions, the consumer's digital videocassette 10 would hold the stored digital video indefinitely. There are various ways to circumvent this problem.

First, when the video is downloaded, a system clock can be set allowing the video to remain in the digital videocassette 10 for the agreed upon rental period. After the period expires, the data is automatically erased. There is a desirable inherent flexibility in this scheme; a consumer can request to have the data downloaded for an arbitrary period of time (e.g., 1 day, 2 days, 1 week, etc.) with a corresponding adjustment in the rental fee. The software that programs the digital videocassette 10 can easily manage this. In addition, it makes it much simpler for a video rental agency to support sales, promotions, charge different fees for different quality videos (e.g. a "HOT" recent release). Further, since the stored contents will be erased automatically by the digital videocassette 10 once the system clock runs out, the consumer does not have to make a return trip to the rental agency.

An alternative answer as to how long the video remains usable in the digital videocassette 10 is to allow it to be stored indefinitely and retain some form of usage information. The consumer gets charged initially when he rents the movie and then additionally if the usage information indicates this is warranted. It is noted that this type of scheme implies that the video company owns the digital videocassette 10 and the consumer must return it. With this in mind, there are various ways to define "usage information". The simplest and most conventional is to charge per day. The consumer keeps the digital videocassette 10 for n days. After that, he pays an overdue fine. Alternatively, the user is given n minutes of viewing time. If he exceeds this, he is charged additionally. Of the two methods, the charging per day is the model most consumers are used to and probably most comfortable with. However, there are times when the second method may be more desirable.

Finally, it is worth noting that the cost of a store-owned digital videocassette 10 will probably exceed the cost of a personal copy of the video contents it is programmed with. Thus, a consumer may have a strong incentive to erase the contents and keep the digital videocassette 10. The risk to the video rental company is certainly no greater than the risk that the consumer will record the content of an analog video that they have rented onto a blank analog tape—probably less.

However, as mentioned above, a consumer can purchase the digital videocassette 10 for downloading movies or programs from a rental agency's database or a video server. The consumer from his home can utilize the subscribing means to download the data directly to his digital videocassette 10, similar to a pay-per-view service. This is a low-tech and inexpensive solution to video-on-demand, since a setup box, like a cable box, is not required. The consumer dials the service provider, which may be the local rental agency or a video server, through the built-in modem or by an external modem hook-up, via the data download port 18 and downloads the data directly to the magnetic storage medium 12 of his digital videocassette 10.

In a similar fashion, the digital videocassette 10 can be used to download stock quotes, restaurant information, news reports, trial reports, etc. Additionally, in one embodiment a cellular telephone/modem is built-in for downloading or transmitting movies, programs, or any stored information from anywhere in the world, without having to connect the digital videocassette 10 to a telephone line.

It will be understood that each of the elements described above, or two or more together, may also find useful application in other types of constructions differing from the type described above.

While the invention has been illustrated and described as to a digital videocassette, it is not intended to be limited to the details shown, since it will be understood that various omissions, modifications, substitutions and changes in the forms and details of the device illustrated and in its operation can be made by those skilled in the art without departing in any way from the spirit of the present invention.

What is claimed as new and desired to be protected by Letters Patent is set forth in the appended claims:

1. A videocassette device for use in a magnetic tape playback apparatus, comprising:

means for storing digitized audio-visual information;

means for converting said digitized audio-visual information to an analog format;

a contact head for transferring the audio-visual information in the analog format to a videotape loop; and a videocassette housing for housing said means for storing, converting means, contact head and videotape loop, said videocassette housing dimensioned for insertion into and removal from the playback apparatus as a substitute for a standard videocassette normally inserted within the apparatus.

2. A device as in claim 1, wherein said storage means is a magnetic disk.

3. A device as in claim 1, wherein said storage means is an optical disk.

4. A device as in claim 1, wherein the audio-visual information can be played back via an external playback means of the playback apparatus coupled to the videotape loop, and said videocassette device further including means for erasing and re-recording, in a playback mode of the playback means, a first portion of the videotape loop following playback as another portion of said videotape loop is played back in the playback mode by said playback means.

5. A device as in claim 1, wherein said videocassette housing is such that said videotape loop is capable of contacting a tape head located within a playback system of a standard VHS videocassette recorder.

6. A device as in claim 1, wherein said videocassette housing is adapted for insertion within a videocassette recorder having a playback system, and further wherein said videocassette device includes playback means that interfaces with said playback system for permitting playback of said converted audio-visual information responsive to command signals associated with said playback system of said videocassette recorder.

7. A device as in claim 4, wherein said magnetic tape playback apparatus comprises a videocassette recorder, and said analog format is such that a magnetic head of said videocassette recorder is capable of reading the information recorded onto said tape loop and playing back said data when said device is inserted therein.

8. A device as in claim 7, wherein the videocassette recorder is a standard VHS recorder.

9. A device as in claim 1, further comprising a function control port for accepting commands from a user selected from the group consisting of fast-forward, rewind, and still frame.

10. A device as in claim 9, wherein said function control port is electrically coupled to a magnetic medium controller logic board within said device for facilitating the execution of said commands.

11. A device as in claim 1, further comprising a data download port for receiving programming via a wide or local area network and downloading said programming.

12. A device as in claim 11, wherein said means for storing comprises a magnetic storage medium and said data download port is electrically coupled to a magnetic medium controller logic board within said device for downloading said received programming to said magnetic storage medium.

13. A device as in claim 11, further including means for facilitating instant playback of said programming being received.

14. A device as in claim 11, wherein said data download port can be used to download audio-visual programs from a program database having a plurality of digitized programs.

15. A device as in claim 1, wherein said device is adapted for insertion within a playback system having a pair of spindles, and said device further including a pair of sensors each for sensing rotation of an associated said spindle for determining one of a desired rewinding, fast-forwarding, still frame or play function, and said means for converting being responsive to corresponding sensing information provided by said sensors to provide the desired function.

16. A device as in claim 1, including a magnetic medium controller logic circuit having said means for converting, said logic circuit being coupled to said means for storing and said means for accessing.

17. A videocassette device for use in a magnetic tape playback apparatus, comprising:

a magnetic storage medium for storing digitized audio-visual information;

a magnetic medium controller logic circuit coupled to said magnetic storage medium, for converting the digitized information to an analog format;

a contact head for transferring the information in analog format to a videotape loop; and a videocassette housing for housing said magnetic storage medium, said logic circuit, said contact head and said videotape loop, said housing adapted to be inserted into a playback device for subsequent transfer of the analog information from the videotape loop to the playback apparatus, and said videocassette housing dimensioned for insertion into and removal from the playback apparatus as a substitute for a standard videocassette normally inserted within the playback apparatus.

* * * * *